No. 893,607. PATENTED JULY 21, 1908.
S. F. CLOUSER.
BELT CHAIN.
APPLICATION FILED SEPT. 11, 1907.
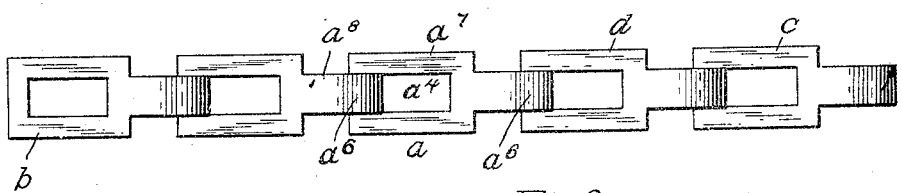
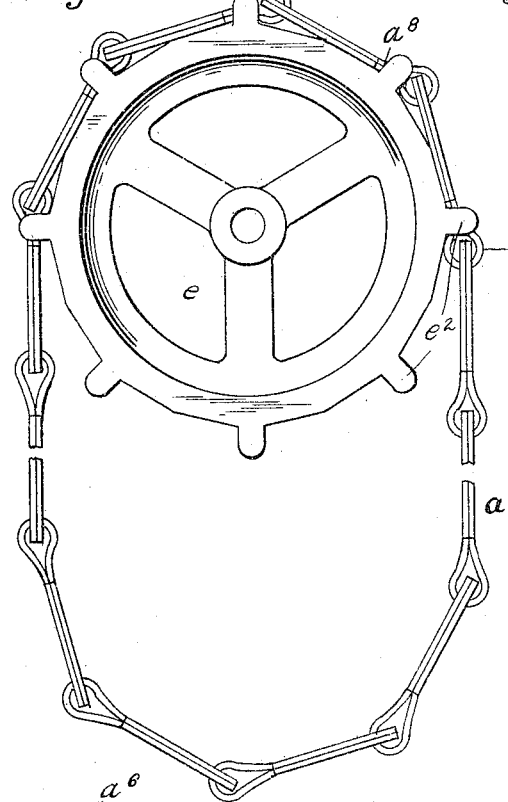
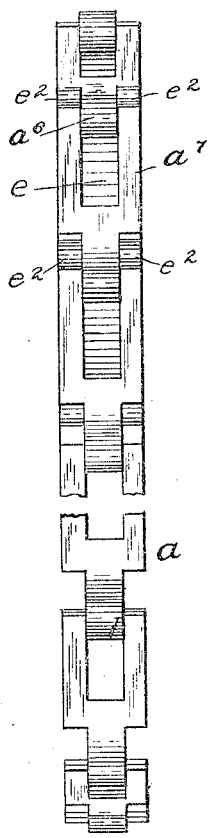
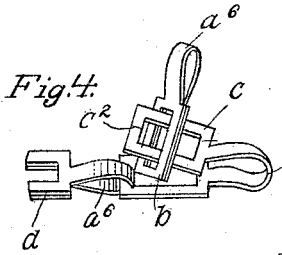
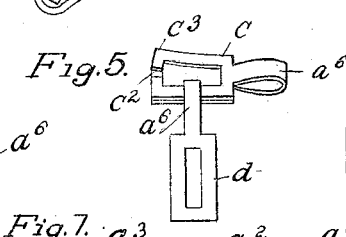
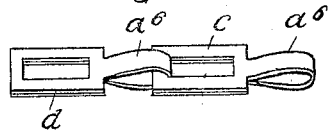
WITNESSES
INVENTOR
Samuel F. Clouser.
BY
ATTORNEYS

UNITED STATES PATENT OFFICE.

SAMUEL F. CLOUSER, OF BROOKLYN, NEW YORK.

BELT-CHAIN.

No. 893,607.

Specification of Letters Patent.

Patented July 21, 1908.

Application filed September 11, 1907. Serial No. 392,351.

*To all whom it may concern:*

Be it known that I, SAMUEL F. CLOUSER, a citizen of the United States, and residing at Brooklyn, in the county of Kings and State of New York, have invented certain new and useful Improvements in Belt-Chains, of which the following is a specification, such as will enable those skilled in the art to which it appertains to make and use the same.

This invention relates to belt chains for use as power chains, elevator chains, conveyer chains and like purposes; and the object of the invention is to provide an improved endless belt chain of this class which may be cheaply formed and conveniently used for any of the various purposes specified.

The invention is fully disclosed in the following specification, of which the accompanying drawing forms a part, in which the separate parts of my improvement are designated by suitable reference characters in each of the views, and in which:—

Figure 1 is a plan view of a short section of a chain used by me in the production or manufacture of my improved endless belt chain; Fig. 2 a side view of a pulley in connection with which my improved endless belt chain is employed; Fig. 3 a face view of the pulley and chain as shown in Fig. 2; Fig. 4 a perspective view showing one step of connecting the end links of a chain made as shown in Fig. 1 to form an endless belt chain as shown in Fig. 2; Fig. 5 a view similar to Fig. 4 showing another step of the process of connecting the end links of the chain to form the endless belt or drive chain; Fig. 6 a view similar to Figs. 4 and 5 but showing the end links of the chain fully connected; and, Fig. 7 a view of a blank from which one of the links of the chain shown in Fig. 1 is made.

In the practice of my invention, I take a chain $a$, Fig. 1, all the links of which are similar in form and each of said links is made from a blank $a^2$ shown in Fig. 7, the said blank consisting of rectangular end pieces $a^3$ having longitudinal slots or openings $a^4$ and connected by a central longitudinal strip $a^5$, and in forming a link from this blank the said blank is folded centrally of the strip $a^5$ so that one of the end pieces or parts $a^3$ will lie flat upon the other, and in this operation the central strip $a^5$ is formed into a loop or ring member $a^6$, and the link consists of a rectangular body portion $a^7$ provided at one end with said loop or ring member which projects centrally from said end, and the transverse width of the loop or ring member $a^6$ is preferably substantially the same as the transverse width of the separate side portions of the body part of the link and of the transverse width of the ends of the body portion of the link. In connecting a number of links made in this way to form a chain, the side parts of the separate links are separated and one of the side parts of one link is passed between the side parts of the other link and the said links are swung into position so that the loop or ring member $a^6$ of one will engage the opposite transverse end portion of the other link, and in this way a chain of any desired length may be formed.

In order to describe the method of connecting the ends of a chain made in this manner so as to form an endless belt or drive chain, the end links of the chain shown in Fig. 1 will be given different reference characters, one of said links being designated by the reference character $b$ and the other by the reference character $c$, and the link adjacent to the link $c$ by the reference character $d$, and these are the links shown in Fig. 4, and the links $c$ and $d$ only are shown in Figs. 5 and 6. The transverse end portion of one part of the body portion of the link $c$ opposite the loop or ring member $a^6$ is slitted transversely of said end portion, or longitudinally of the link as shown at $c^2$, and the loop or ring member $a^6$ of the link $d$ is turned onto one side of the link $c$ as shown in Fig. 5 and the other side of said part of the link $c$ is raised as shown at $c^3$, after which the link $d$ is swung back under the raised part of the link $c$ and the opposite side of said link is raised also and the link $d$ is swung back onto the end part of the other portion of the link $c$ as shown in Fig. 4, and the link $b$ at the opposite end of the chain is passed on over the raised part of the link $c$ as indicated in Fig. 4. One side part of the raised portion of the link $c$ is then depressed and the loop or ring member $a^6$ of the link $d$ is swung thereonto after which the other side part of the raised portion of the link $c$ is depressed, and the link $d$ may then be swung back into the position shown in Fig. 6 and Fig. 1 and the ends of the chain are connected to form the belt or drive chain shown in Figs. 2 and 3. I have also shown in Figs. 2 and 3, a pulley or drive wheel $e$ which is particularly adapted for use in connection with my improved belt or drive chain, and said pulley is provided at the opposite sides of the perimeter thereof with equally spaced pairs of sprockets $e^2$, and the distance between the separate pairs of sprockets $e^2$ is substantially equal to the length of the body portion of the links of the drive chain and the distance between the separate sprockets of each pair is substantially the same as the transverse width of the neck of the ring or loop members $a^6$ of the links of said chain, and in the operation of the pulley or wheel $e$ and in the movement of the chain thereon, the separate pairs of sprockets $e^2$ bear on the ends of the body portions of the links of the chain. It will be observed that between the body portion of each link and its loop or ring member $a^6$ is a short neck portion $a^8$, and these neck portions fit, in the operation of the pulley and chain, between the separate pairs of sprockets $e^2$ and the cross head portions of the body part of each link opposite the loop or ring members $a^6$ are free to turn in the corresponding loop or ring members of the corresponding links of the chain.

It will be understood that my improved belt chain or drive chain may be used in connection with any kind or class of apparatus, and while in the accompanying drawing, I have shown but one pulley or wheel, it will be understood that two or more may be provided, and my improved belt or drive chain may be used as a conveyer or bucket chain in which case the buckets will be attached directly to the body portions of the links by bolts or screws passing through the slots or openings $a^4$, and in this way a conveyer or elevator chain may be made without providing any independent form of attachment for connecting the buckets with said chain.

In the form of construction shown, the spaces between the separate pairs of sprockets on the wheel $e$ are not segmental or arc-shaped but are preferably composed of two straight facets or surfaces, and in practice the body portions of the links of the chain rest on these facets or surfaces, and it will be understood that the pulley or wheel may be driven in either direction, and the separate pairs of sprockets or teeth $e^2$ will operate in connection with the ends of the body portion of the links of the chain and the chain will be driven in the same manner as in other power apparatus of this class.

Having fully described my invention, what I claim as new and desire to secure by Letters Patent, is:—

1. An endless belt power chain composed of links each consisting of a blank composed of two rectangular end portions connected by a longitudinal strip, said blank being folded centrally of said strip so as to form a loop or ring member of the latter and the body of the link from the separate end parts thereof, the transverse end portion of the body part of one of the end links of the chain opposite the loop or ring member thereof being slitted transversely, or longitudinally of the link.

2. A power chain link composed of a blank consisting of two similar rectangular and oblong end portions connected by a longitudinal strip, said blank being folded centrally of said strip so as to form the body portion of the link from said end portions and a loop or ring member from said strip at one end of the body portion of the link, one of the end portions of the blank being slitted longitudinally of the link at the end opposite the loop or ring member.

3. In a power device of the class described, a pulley the perimeter of which is provided at regular intervals with pairs of oppositely arranged sprockets, and an endless drive chain the links of which comprise a body portion and a neck portion at one end of the body portion forming a loop or ring, the distance between the separate pairs of sprockets being substantially equal to the length of the body portion of said links, and the neck portion of the loop or ring members of the chain being adapted to fit between the sprockets of the separate pairs whereby the said sprockets of the separate pairs in the operation of the apparatus bear on the ends of the body portion of said links, the links of the chain being each composed of a blank consisting of two similar end portions connected by a longitudinal strip, said blank being folded centrally of said strip so as to form the body portion of the link from said end portions and the loop or ring member at one end of the body portion of the link, one of the end portions of the blank which form the body portion of the link being slitted longitudinally of the link at the end opposite the loop or ring member.

4. A power chain composed of a blank consisting of two similar rectangular and oblong end portions having oblong openings and connected by a longitudinal strip of substantially one-third the transverse dimensions of the end portions, said blank being folded centrally of said strip so as to form the body portion of the link from said end portions and a loop or ring member at one end of said link from said strip, one of the end portions of the blank from which the body portion of the link is formed being slitted longitudinally of the link at the end opposite the loop or ring member.

In testimony that I claim the foregoing as my invention I have signed my name in presence of the subscribing witnesses this 6th day of September 1907.

SAMUEL F. CLOUSER.

Witnesses:
 M. E. DOODY,
 C. E. MULREANY.